(12) United States Patent
Lavery et al.

(10) Patent No.: US 12,118,574 B2
(45) Date of Patent: Oct. 15, 2024

(54) GROUPING ASSOCIATED CUSTOMERS WITH A CONNECTED CUSTOMER

(71) Applicant: Zebra Technologies Corporation, Lincolnshire, IL (US)

(72) Inventors: Richard J. Lavery, Huntington, NY (US); Russell Calvarese, Stony Brook, NY (US); Charles G. Lauria, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 306 days.

(21) Appl. No.: 16/217,918

(22) Filed: Dec. 12, 2018

(65) Prior Publication Data

US 2020/0193453 A1 Jun. 18, 2020

(51) Int. Cl.
  *G06Q 30/0201* (2023.01)
  *H04W 4/021* (2018.01)
  *H04W 4/029* (2018.01)

(52) U.S. Cl.
  CPC ........ *G06Q 30/0201* (2013.01); *H04W 4/021* (2013.01); *H04W 4/029* (2018.02)

(58) Field of Classification Search
  None
  See application file for complete search history.

(56) References Cited

U.S. PATENT DOCUMENTS

| | | | |
|---|---|---|---|
| 10,249,116 B1* | 4/2019 | Nagpal | H04L 63/0876 |
| 11,283,885 B2* | 3/2022 | Rosen | G06Q 30/0272 |
| 2004/0093281 A1* | 5/2004 | Silverstein | G06Q 20/04 |
| | | | 705/26.8 |
| 2004/0111454 A1* | 6/2004 | Sorensen | G06Q 30/02 |
| | | | 708/200 |
| 2006/0200378 A1* | 9/2006 | Sorensen | G06Q 30/0203 |
| | | | 705/7.29 |
| 2011/0046878 A1* | 2/2011 | Sung | H04W 12/06 |
| | | | 701/467 |
| 2016/0080907 A1* | 3/2016 | Saleem | H04L 67/12 |
| | | | 455/456.1 |
| 2016/0247175 A1* | 8/2016 | Milton | G06Q 30/0205 |
| 2017/0228804 A1* | 8/2017 | Soni | G06Q 30/0641 |
| 2017/0308909 A1* | 10/2017 | Faith | G06V 40/176 |
| 2017/0344834 A1* | 11/2017 | Hirakawa | G06K 9/00771 |
| 2019/0122084 A1* | 4/2019 | Austin | G06K 7/10425 |
| 2019/0122140 A1* | 4/2019 | Sen | G06N 3/088 |

\* cited by examiner

*Primary Examiner* — Chesiree A Walton (57) ABSTRACT

A system and method for grouping associated customers with connected customers. In various aspects, a controller detects, via data obtained by a plurality of detector stations, a plurality of individuals, including associated and connected customers, entering the venue. The controller monitors, via the data obtained by the plurality of detector stations, a location of each individuals to generate a confidence level that the connected customer and the associated customer are members of a group. The controller determines that the confidence level exceeds a threshold confidence level. In response, the controller updates an account associated with the connected customer based on tracking data associated with the associated customer.

21 Claims, 7 Drawing Sheets

GROUPING ASSOCIATED CUSTOMERS WITH A CONNECTED CUSTOMER

BACKGROUND OF THE INVENTION

Many venue operators distribute mobile phone applications that provide discounts, rewards, and other benefits to enrolled or "connected" customers. In exchange for the discounts, the mobile phone application monitors tracking data associated with the connected customer at the operator's venue. Based on the tracking data, the venue operator is able to better target the discounts provided through the mobile phone application.

However, many customers do not download a venue operator's mobile phone application. If a connected customer visits a venue with non-connected or "associated" customers, the venue operator is unable to determine that the connected customer and the corresponding associated customers are members of the same group. As a result, the venue operator is unable to provide discounts or rewards that are beneficial to the associated customer and/or the connected customer via his or her association with the associated customer. Accordingly, there is a need for grouping associated customers with a connected customer.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments of the present disclosure include a system for tracking individuals within a venue. The system may include a plurality of detector stations disposed throughout the venue. Each detector station may include an imaging assembly and a transceiver configured to communicate with a communication device within the venue. The system may also include a controller operatively connected to the plurality of detector stations. The controller may include at least one processor configured to detect, via data obtained by the plurality of detector stations, a plurality of individuals entering the venue. One or more of the plurality of individuals is a primary individual that (i) is carrying a communication device and (ii) has an account associated with the venue, and one or more of the plurality of individuals is a secondary individual that (i) is not carrying a communication device and/or (ii) has no account associated with the venue. The controller may also be configured to monitor, via the data obtained by the plurality of detector stations, a respective location of each individual from the plurality of individuals as each individual traverses the venue and generate a confidence level that one of the primary individuals and at least one of the secondary individuals are members of a group. The controller may also be configured to determine that the confidence level exceeds a threshold confidence level and update the account associated with the venue of the one of the primary individuals based on tracking data associated with the at least one of the secondary individuals. The tracking data may be generated from the data obtained by the plurality of detector stations.

In some embodiments, to update the account associated with the one of the primary individuals (e.g., connected customers), the controller may be configured to analyze the tracking data to identify a product that the at least one of the secondary individuals (e.g., associated customers) remained proximate to for a predetermined amount of time, picked up, and/or purchased while at the venue. The controller may then be configured to update the account of the one of the primary individuals to include an indication of the product. Accordingly, the controller may be configured to transmit a coupon, product reviews, and/or other product information to a communication device of the one of the primary individuals.

As described herein, the controller is configured to monitor a location of the one of the primary individuals based on communications received from the respective communication device of the one of the primary individuals. On the other hand, the controller is configured to monitor a location of the at least one of the secondary individuals by tracking a video object corresponding to the at least one of the secondary individuals.

In some embodiments, the controller is configured to determine that the one of the primary individuals and the at least one of the secondary individuals entered the venue within a threshold time of one another to generate the confidence level that the one of the primary individuals and the at least one of the secondary individuals are members of the group. In response, the controller may be configured to increase the confidence level that the one of the primary individuals and the at least one of the secondary individuals are members of the group.

In some embodiments, the tracking data includes location data for an individual and/or a path traversed by an individual. In these embodiments, the controller may be configured to determine a correlation between a first path traversed by the one of the primary individuals and a second path traversed by the at least one of the secondary individuals to generate the confidence level that the one of the primary individuals and the at least one of the secondary individuals are members of the group. Based on the correlation between the first path and the second path, the controller may be configured to modify the confidence level. In one example, the controller is configured to determine an amount of time the first path and the second path are within a threshold distance of one another while within the venue. To this end, the controller may be configured to determine a number of times the first path and the second path diverge and reconverge. In some embodiments, this includes non-contiguous periods of time when the first path and the second path are within the threshold distance. In another example, the controller is configured to determine a distance between the one of the primary individuals and the at least one of the secondary individuals.

In still another example, the controller is configured to determine an orientation between the one of the primary individuals and the at least one of the secondary individuals. To this end, the controller may be configured to determine that the first path and the second path indicate that the one of the primary individuals and the at least one of the secondary individuals are traversing the venue side-by-side. In yet another example, the controller is configured to determine a region of the venue where the first path and the second path are correlated. Based on any combination of the above example determinations, the controller may be configured to modify the confidence level accordingly. In some embodiments, the controller inputs the tracking data into a machine learning algorithm that is configured to determine the confidence level based on at least any combination of the above-described factors.

In some embodiments, the controller may verify its determination of the at least one secondary individual being in the group. Accordingly, the controller may be configured to transmit a confirmation request to the communication device of the one of the primary individuals requesting that the one of the primary individuals confirms that the at least one of the secondary individuals is a member of the group. In response to a confirmation received from the communication device of the one of the primary individuals, the controller may be configured to update the account to indicate the grouping. In embodiments in which the confidence level is determined using a machine learning algorithm, in response to the controller receiving the confirmation, the controller provides an indication of positive reinforcement associated with the grouping of the one of the primary individuals. On the other hand, in these embodiments, in response to the controller failing to receive the confirmation, the controller provides an indication of negative reinforcement associated with the grouping of the one of the primary individuals. Due to this reinforcement training, the controller is able to improve the accuracy of the machine learning algorithm over time.

After grouping one of the primary individuals and at least one of the secondary individuals, the controller may be configured to support other group-based functionality. In one example, the controller is configured to generate a heat map indicative of an amount of time members of the group spent in different regions of the venue. In this example, the controller may be configured to update the account to include an indication of the heat map. In another example, the controller is configured to support the ability to locate other group members, including secondary individuals. Accordingly, the controller may be configured to (1) receive, from the communication device of the one of the primary individuals, a location request for at least one other member of the group; (2) analyze the tracking data associated with the at least one other member of the group to determine a respective location for each of the at least one other member of the group; and (3) transmit, to the communication device of the one of the primary individuals, an indication of the respective locations for the at least one other member of the group.

To protect the privacy considerations for secondary individuals, the controller may be configured to detect that the one of the primary individuals and the at least one of the secondary individuals have left the venue. In response, the controller may be configured to update the account to remove the indication that the one of the primary individuals and the one of the secondary individuals are members of the group. In some embodiments, the account is also updated to indicate a group size for the visit. The controller may be configured to utilize this historical group size information in determining the confidence level during future visits to the venue.

Figure 1:
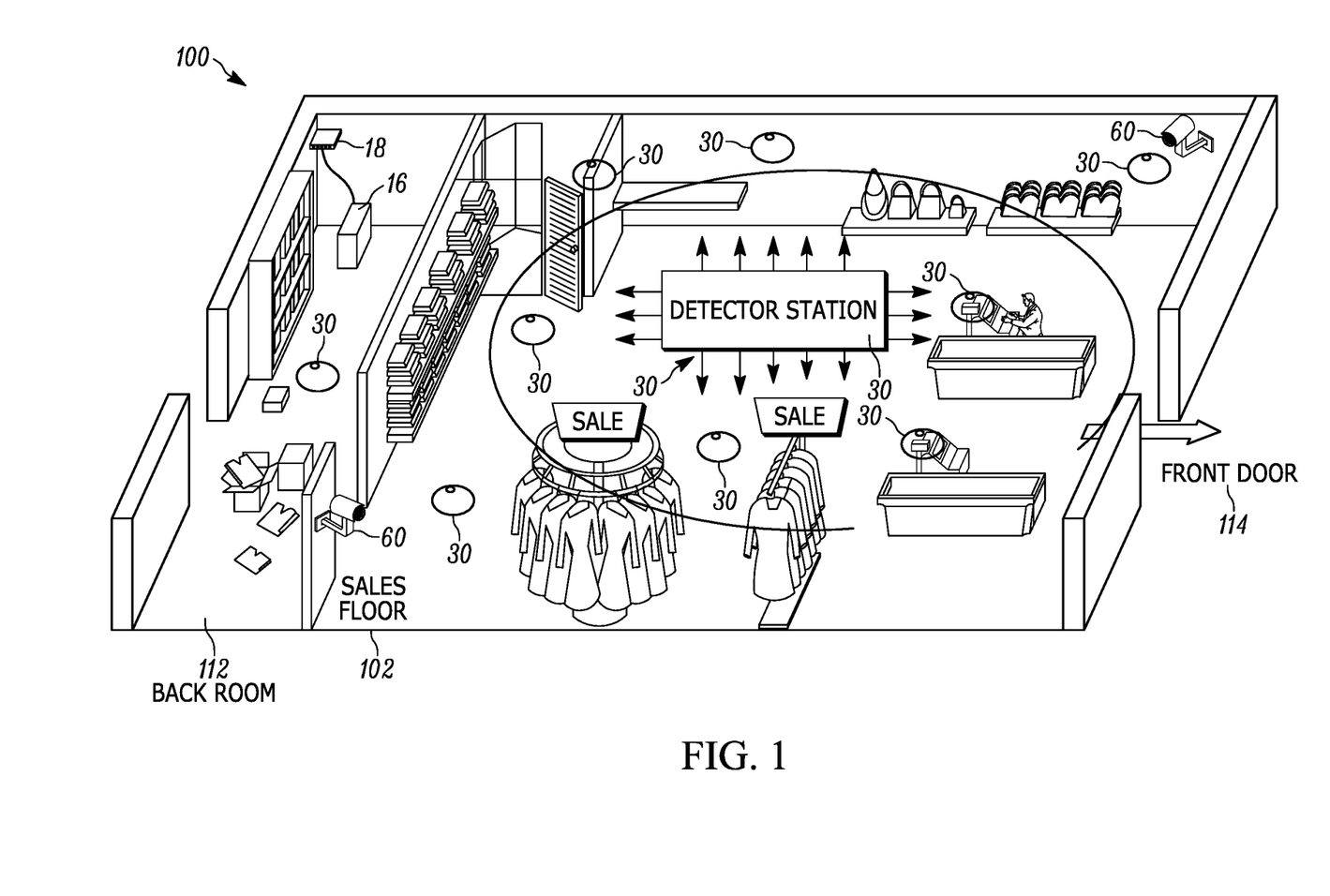
FIG. 1 is a perspective view, as seen from above, of a venue illustrating an arrangement for which a positioning system within the venue is deployed to facilitate grouping associated customers with a connected customer, in accordance with an example.

FIG. 1 is a perspective view, as seen from above, of a venue 100 illustrating an arrangement for which a positioning system within the venue 100 is deployed to facilitate grouping associated customers with a connected customer. Although the example venue 100 is a retail venue, other types of venues (such as an airport, a stadium, a performance center, a museum, and so on) are envisioned. In the example embodiment of FIG. 1, the venue 100 includes a front door 114 via which customer ingress/egress from the venue and a backroom 112 that has a centralized controller 16. In other embodiments, the centralized controller 16 may be located off-venue. The centralized controller 16 may be operated by store personnel and/or personnel associated with the positioning system.

The centralized controller 16 may comprise a networked host computer or server. The centralized controller 16 may be connected to a plurality of detector stations 30 positioned throughout the venue 100 via the network switch 18. As further described herein, the detector stations 30 may include one or more transceivers configured to detect communication signals transmitted by communication devices located at the venue 100. The detector stations 30 may include one or more sensors, such as image sensors, ultrasonic sensors, etc. In some embodiments, in addition to any image sensors included in the detector stations 30, the example venue 100 may include one or more dedicated image sensors 60 configured to capture image data representative of various locations of the venue 100.

Each of the detector stations 30 and the image sensors 60 may either be in either wired or wireless electronic communication with centralized controller 16 via the network switch 18. For example, in some embodiments, the detector stations 30 and the image sensors 60 may be connected via Category 5 or 6 cables and use the Ethernet standard for wired communications. In other embodiments, the detector stations 30 and the image sensors 60 may be connected wirelessly, using the built-in wireless transceiver, and may use the IEEE 802.11 (WiFi) and/or Bluetooth standards for wireless communications. Other embodiments may include detector stations 30 and image sensors 60 that use a combination of wired and wireless communication.

Figure 2:
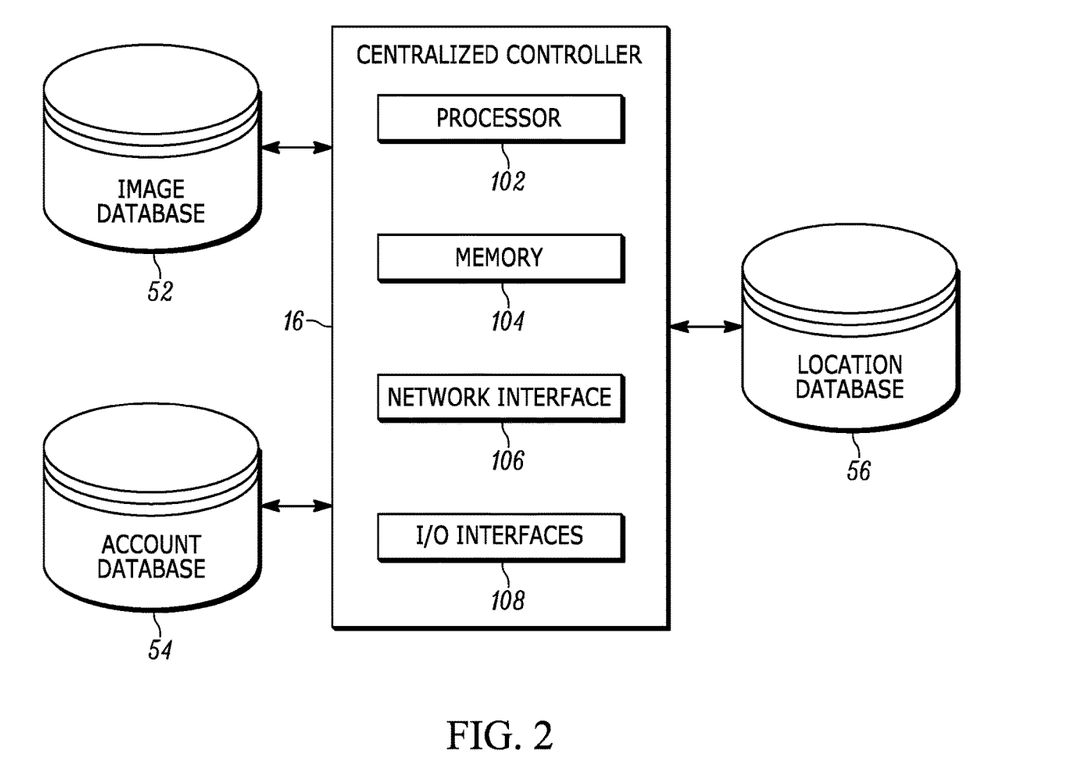
FIG. 2 is a block diagram representative of an embodiment of a centralized controller of FIG. 1.

FIG. 2 is a block diagram representative of an embodiment of centralized controller 16 of FIG. 1. The centralized controller 16 is configured to execute computer instructions to perform operations associated with the systems and methods as described herein, for example, implement the example operations represented by the block diagrams or flowcharts of the drawings accompanying this description. The centralized controller 16 may implement enterprise service software that may include, for example, Restful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. As described below, the centralized controller 16 may be specifically configured for performing operations represented by the block diagrams or flowcharts of the drawings described herein.

The example centralized controller 16 of FIG. 2 includes a processor 102, such as, for example, one or more microprocessors, controllers, and/or any suitable type of processor. The example centralized controller 16 of FIG. 2 further includes memory (e.g., volatile memory or non-volatile memory) 104 accessible by the processor 102, for example, via a memory controller (not shown). The example processor 102 interacts with the memory 104 to obtain, for example, machine-readable instructions stored in the memory 104 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the centralized controller 16 to provide access to the machine-readable instructions stored thereon.

The example centralized controller 16 of FIG. 2 may further include a network interface 106 to enable communication with other machines via, for example, one or more computer networks, such as a local area network (LAN) or a wide area network (WAN), e.g., the Internet. The example network interface 106 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example centralized controller 16 of FIG. 2 includes input/output (I/O) interfaces 108 to enable receipt of user input and communication of output data to the user, which may include, for example, any number of keyboards, mice, USB drives, optical drives, screens, touchscreens, etc.

The example centralized controller 16 of FIG. 2 is operatively connected to an image database 52 that stores image data representative of the venue 100. To this end, the example centralized controller 16 may store any data received from the image sensors 60 and/or detectors 30 at the image database 52. In some embodiments, the image data stored at the image database 52 includes metadata, such as a list of object identifiers included in a set of image data corresponding to a video object tracked across multiple frames, image sensors 60 and/or detectors 30. Additionally, the centralized controller 16 may be operatively connected to an account database 54 that stores records indicative of user accounts corresponding to connected customers. The user accounts may include indications of other group members, products of interest, historical group information, information relating to user's communication device, heat maps indicative of regions of interest at the venue 100, and other information about each connected customer.

The example centralized controller 16 of FIG. 2 is also operatively connected to a location database 56 that includes location information for a plurality of individuals located at the venue 100. The records maintained at location database 56 may be associated with an account identifier indicative of a connected customer and/or a video object identifier indicative of an associated customer. Additionally, the record for each individual may include a listing to and/or reference of other group members. As a result, if the centralized controller 16 receives a location request from a particular connected customer, the centralized controller 16 is able to query the location database to obtain the location information for the other group members.

It will be appreciated that although FIG. 2 illustrates the image database 52, the account database 54, and the location database 56 as being external to the example centralized controller 16, other example centralized controllers 16 may internally include the image database 52, account database 54, and/or the location database 56. Additionally, in some embodiments, one or more of the image database 52, the account database 54, and the location database 56 may be combined into a single database.

Figure 3:
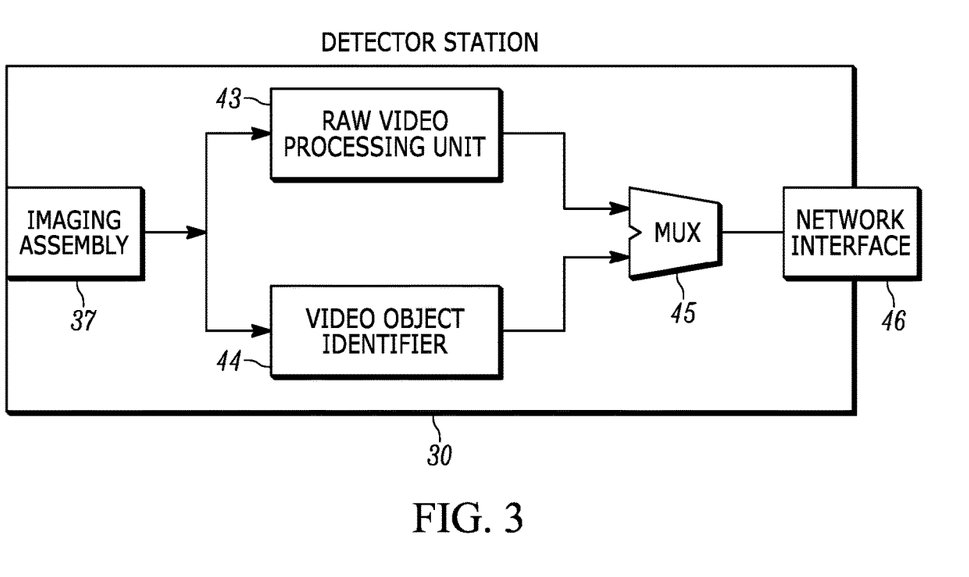
FIG. 3 is a block diagram illustrating an example implementation of a detector station as may be used in the venue of FIG. 1, in accordance with an example embodiment.

FIG. 3 is a block diagram illustrating an example embodiment of a detector station 30. In the illustrated example, the detector station 30 includes an imaging assembly 37. The imaging assembly 37 may include a camera or a wide angle camera and include any known imaging components for capturing image data. For example, the imaging assembly 37 may include an array of image sensors configured to detect reflections of light that pass through a lens system. In some embodiments, the imaging assembly 37 includes an illumination assembly configured to emit light at a particular frequency or range of frequencies. Additionally or alternatively, the imaging assembly 37 may include one or more filters configured to filter the reflected light before and/or after it is sensed by the image sensor array.

The example detector station 30 is configured to transmit any image data captured by the imaging assembly 37 to the centralized controller 16. Accordingly, the image data is passed to the raw video processing unit 43 to convert the raw video into a format more suitable for transmission to the centralized controller 16. For example, the raw video processing unit 43 may be configured to compress the raw video data using any known video compression algorithm. The raw video processing unit 43 then generates a data packet to transmit the image data to the centralized controller 16 via a network interface 46 which is paired to the network interface 106 of the centralized control 16.

Additionally, the example detector station 30 includes a video object identifier 44 that includes one or more processor that execute a set of instructions configured to analyze image data captured by the imaging assembly 37. More particularly, the video object identifier 44 is configured to analyze the image data to detect, label, and/or identify video objects indicative of individuals at the venue 100. Upon detecting the presence of a video object (for example by executing a facial recognition algorithm using the raw image data), the video object identifier 44 associates a portion of the raw image data with an identifier of the video object. In some embodiments, the example detector station 30 includes a local video object database (not depicted) that stores a record of currently-tracked video object and the corresponding object identifiers. Accordingly, in these embodiments, the video object identifier 44 may compare the detected video object to video objects in the local object database to determine the identifier associated with the video object. If there is no corresponding video object in the local video object database, the video object identifier 44 may assign the detected video object a new identifier.

The example video object identifier 44 routes the video object identifiers to a multiplexer 45 which appends the indication to a data packet produced by the raw video processing unit 43. For example, the multiplexer 45 may include the indications of an <x,y> coordinate in the set of image data representative of a new video object and the corresponding identifier as flags included in the header of a data packet that includes the compressed image data in the body. In other example, the multiplex 45 includes the new object identifier in the header of the data packet and the image data representation of the video object is included in the body of the data packet. It should be appreciated due to the processing time differences, the data packet to which the indication of the new video object is appended may include image data other than the image data relied upon by the video object identifier 44 to detect the new video object.

In addition to tracking video objects, the example detector station 30 is also configured to communicate with communication devices associated with connected customers at the venue 100 via the network interface 46. For example, the network interface 46 may include a Wi-Fi hotspot to which an application executing on the communication device is configured to cause the communication device to automatically connect when located at the venue 100. When a communication device is connected to the network interface 46, the example detector station 30 and/or the centralized controller 16 may assign the connection a connection identifier. The example detector station 30 may be configured to monitor a signal strength associated with the connection. Accordingly, the example detector station 30 may relay any connection identifiers and the corresponding signal strengths to the centralized controller 16 via the network interface 46. Consequently, when the centralized controller 16 receives connection identifiers and signal strengths from a plurality of detector stations 30, the centralized controller 16 is able to perform suitable locationing/positioning techniques, such as triangulation, trilateration, multilateration, etc. to determine the location of the connected customer.

It should be appreciated that while the present disclosure generally refers to tracking connected customers via the communications received from the communication device associated with the connected customer, the detector stations 30 and/or the centralized controller 16 may be additionally configured to track the connected customer via the disclosed video object tracking techniques. Accordingly, in these embodiments, the two different tracking techniques may be utilized in conjunction to improve the positioning accuracy for connected customers.

Figure 4:
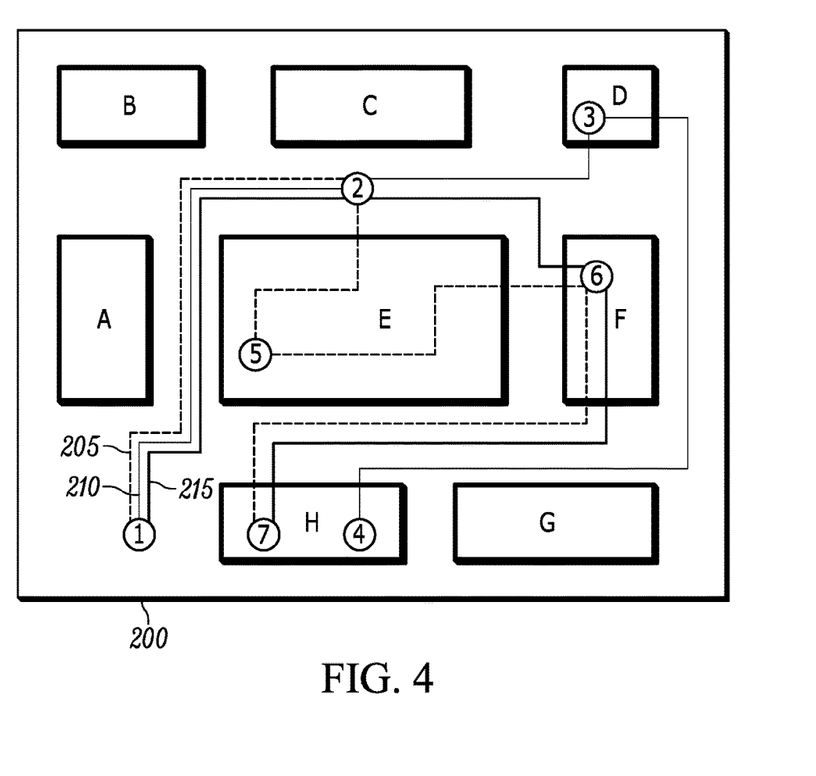
FIG. 4 illustrates example routes traversed by individuals within the venue of FIG. 1.

FIG. 4 illustrates an example scenario 200 where example routes 205, 210, 215 are traversed by a first individual, a second individual, and a third individual, respectively, while within the venue 100 of FIG. 1. As illustrated, the venue 100 is divided into regions A-H. For example, region A may be sporting goods, region B may be groceries, region C may be clothes, and so on. In the illustrated example, region H is a region associated with paying for products in the venue (such as a self-checkout station, an employee-assisted checkout area, or a region that triggers automatic payment of products in a frictionless shopping environment).

In the scenario 200, the first individual is a connected customer carrying a communication device associated with an account with the venue 100; whereas the second and third individuals are associated customers that are not carrying communication devices associated with an account with the venue 100. Accordingly, as described herein, the example centralized controller 16 at the venue 100 determines the route 205 based on communications received from the first individual's communication device. On the other hand, the example centralized controller 16 at the venue 100 determines the routes 210 and 215 based on tracking video objects representative of the second and third individuals, respectively.

Starting at reference point 1, all three of the individuals enter the venue 100. At this time, a detector station 30 located proximate to the front door 114 of the venue 100 detects the presence of the individuals. As described herein, an imaging assembly 37 of the detector station may capture image data that is analyzed by the detector station 30 to identify and label a new video object for each the individuals. Additionally, the network interface 46 may detect an identifier transmitted by the communication device carried by the first individual. In response, the controller 16 at the venue 100 may be configured to begin monitoring the paths 205, 210, 215 to determine whether the second and third individuals are in the same group as the first individual (and/or any other connected customer located at the venue 100).

As illustrated, all three individuals entered the venue at approximately the same time, or at least within a threshold amount of time (e.g., 1 second, 5 seconds, 30 seconds, 1 minute, and so on). Based on the relative time of entry, the centralized controller 16 may assign the relationship between the first individual and the second individual and the relationship between the first individual and the third individual initial confidence levels. In some embodiments, the initial confidence level is determined based upon a relative time of entry between the individuals. In these embodiments, the initial confidence level may be expressed as a function of relative entry time.

At reference point 2, the paths 205, 210, and 215 have been strongly correlated for a period of time. Accordingly, based on this correlation, both the confidence level associated with the relationship between the first individual and the second individual and the confidence level associated with the relationship between the first individual and the third individual may be relatively high. At this point, in the scenario 200, the confidence level for both relationships was strong enough to exceed a threshold confidence level. Accordingly, the centralized controller 16 may be configured to update the location database 56 to indicate that the second individual and the third individual are members of the first individual's group. Consequently, the centralized controller 16 updates the record at the account database 54 for the first individual to indicate any product preferences included in the tracking data associated with the second and third individuals. Additionally, the centralized controller 16 may update the record at the account database 54 for the first individual with any product preferences indicated by the second and third individuals after reference point 2 when the second and the third individuals begin to follow different paths.

For example, starting at reference point 3, the second individual breaks off from the group to visit region D on their own. In the scenario 200, the second individual picks up a product from region D and heads to the payment region H (reference point 4). Accordingly, the controller 16 may analyze the tracking data associated with the second individual to determine any products that the second individual showed an interest in (e.g., by picking, dwelling near, and/or carrying out of the region) while in region D. Additionally, the centralized controller 16 may analyze the tracking data to detect that the second individual purchased a product at region H. Based on this tracking data associated with the second individual, the centralized controller 16 updates the account of the first individual at the account database 54.

Similarly, after reference point 2, the first individual moves to region E (reference point 5) and the third individual moves to region F (reference point 6). In the scenario 200, the centralized controller 16 analyzes the tracking data associated with the first individual while in region E and the third individual while in region F to update the account of the first individual. Accordingly, when the first individual and the third individual reunite to purchase their respective products at the payment region H (reference point 7), the centralized controller 16 includes an indication of the both purchase events in the account of the first individual at the account database 54. It should be appreciated that upon detecting that the first individual, the second individual, and the third individual leave the venue 100 via, for example, the front door 114, the centralized controller 16 may be configured to delete the association between the first individual, the second individual, and the third individual in the relevant databases.

Figure 5:
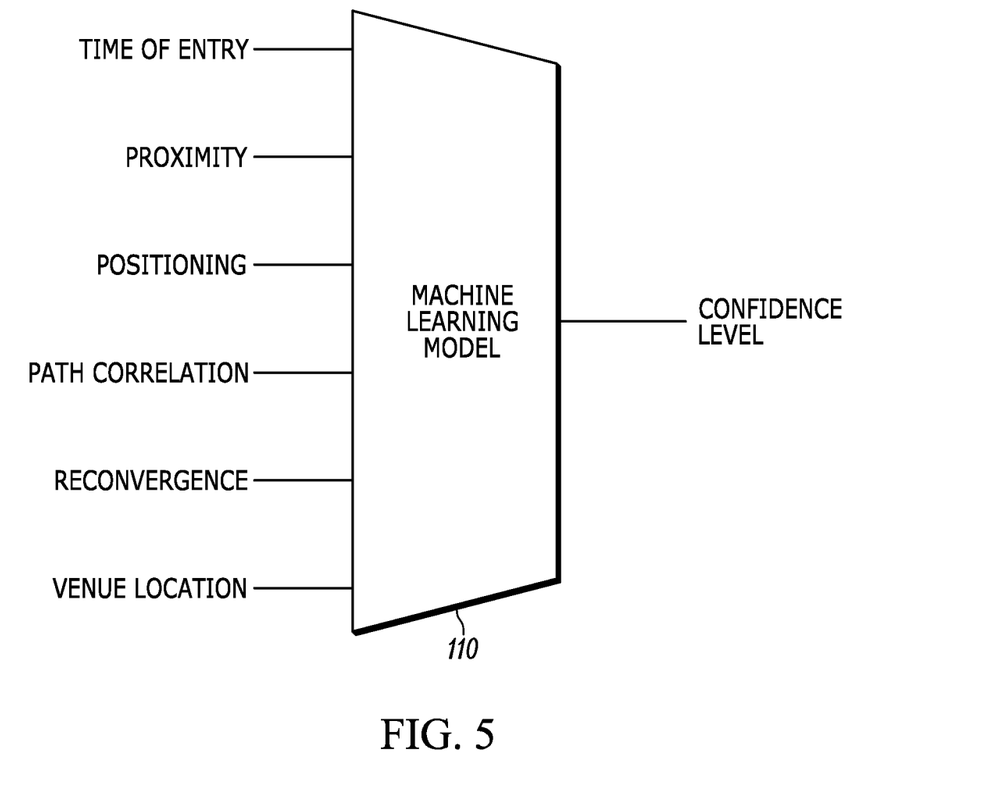
FIG. 5 is a representation of an example machine learning model implemented by the positioning system of FIG. 1 to generate a confidence level that a connected customer and an associated customer are members of a group.

Turning to FIG. 5, FIG. 5 is a representation of an example machine learning model 110 implemented by the positioning system of FIG. 1 to generate a confidence level that a connected customer and an associated customer are members of a group. For example, the example machine learning model 110 may be trained using reinforcement learning techniques. Accordingly, the machine learning model 110 may associate each factor with a scoring function and/or a weighting function. In this example, the reinforcement training may be used to optimize the scoring and/or weighting functions associated with each factor. As another example, the example machine learning model 110 may implement one or more Bayesian techniques to assign a distribution with the various factors described herein. It should be appreciated that in other embodiments, the confidence level is generated without the use of the example machine learning model 110.

Additionally, depending on the timing needs of a particular implementation of the disclosed techniques, the controller 16 may be located locally at the venue 100 and/or at an off-site server or distributed computing platform. Due to the large volume of tracking data generated at the venue 100, the transit time associated with sending the tracking data off-site may introduce meaningful delay into the confidence level determination. On the other hand, distributed computing platforms generally have more processing power than local implementations of the controller 16 and can be configured to execute the calculations associated with the example machine learning model 110 more quickly.

Regardless of the particular machine learning techniques implemented by the machine learning model 110, the example machine learning model 110 may look at various types of tracking data to determine the confidence level that two customers are members of the same group. As one above-described example, the example machine learning model 110 may analyze a difference in time of entry between the two customers to determine an initial confidence level. More particularly, the machine learning model 110 may assign a higher initial confidence level the smaller the difference in time of entry.

Another factor analyzed by the example machine learning model 110 is the proximity between the two customers. That is, the example machine learning model 110 may modify the confidence level that two customers are in a group based on how close the two customers are to one another. Accordingly, the example machine learning model 110 may increase the rate at which the confidence level increases or decreases over time based on the proximity of the two customers. In some embodiments, the amount the example machine learning model 110 increases or decreases the confidence level is modified by the relative positioning of the two customers. To this end, customers that walk side-by-side are more likely to be in the same group than customers that walk in front of one another. In other words, when viewing the relative positions of the two customers in a polar coordinate system centered about one of the customers, the example machine learning model 110 may increase or decrease the confidence level at different rates based on both the radial coordinate and the angular coordinate, both of which associated with respective models on how they impact the confidence level.

Another factor analyzed by the example machine learning model 110 is the location in the venue where the two customers are located. To this end, members of the same group may be more likely to be together in some regions (e.g., a payment area, a concession area) than other areas (e.g., a grocery area). Accordingly, the example machine learning model 110 may modify the rate at which the confidence level increase or decreases based on the region at which the two customers are located.

As yet another factor, the example machine learning model 110 may analyze the correlation of the paths traversed by the first two customers. For example, the example machine learning model 110 determine a ratio between the integral difference between the paths compared to the path length. As another example, the machine learning model 110 may compare a relative shape of the paths. Similarly, in some embodiments, the example machine learning model 110 may identify non-contiguous periods of time where the paths of the two customers are correlated. Generally speaking, the more often that two paths diverge and reconverge, the higher the confidence that the two customers are members of the same group. Accordingly, the example machine learning model 110 may increase the confidence level based in response to detecting that the two paths reconverged (such as by analyzing recent path correlation).

Based on any combination factors (including those not shown in FIG. 5), the example machine learning model 110 may generate a confidence level that the two customers are members of the same group. The controller 16 may then compare this confidence level to a threshold confidence level indicative of the two customers being members of the same group. In some embodiments, training the example machine learning model 110 includes updating the threshold confidence level in addition to determining the amounts that the various factors modify the determined confidence level.

It should be appreciated that the example machine learning model 110 may be configured to analyze the tracking data to determine whether a particular customer and any other customer at the venue 100 are in the same group. As this can involve a significant number of combinations at crowded venues, the example machine learning model 110 may include a lower threshold which, if exceeded, the example machine learning model 110 ceases (at least for a predetermined duration) comparing the tracking data for the two customers. In these embodiments, the processing power of the controller 16 is focused on analyzing the most likely candidates for being members of the same group.

In some embodiments, the example machine learning model 110 may be unable to determine to a sufficient confidence that two customers are members of the same group. Accordingly, the controller 16 may be configured to transmit a confirmation message to a communication device of a connected customer before adding the associated customer to the group. In some embodiments, the controller 16 routes the confirmation message to a particular detector station 30 located proximate to the connected customer for transmission to the communication device.

Figure 6A:
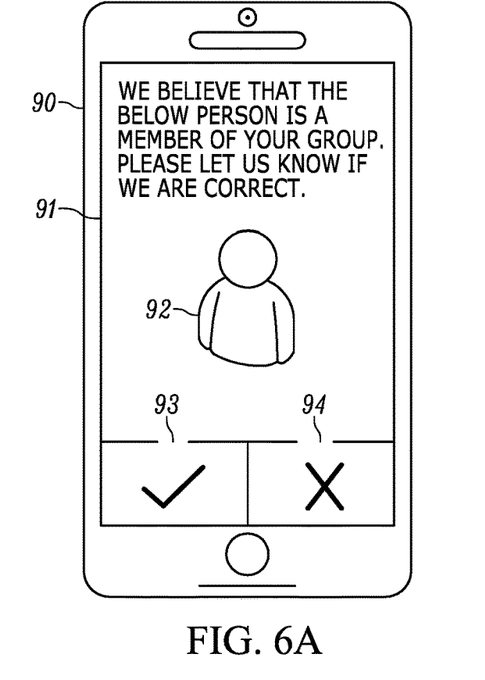
FIG. 6A is an illustration of an example display for a connected customer to confirm that an associated customer is a member of a group while within the venue of FIG. 1.

To this end, FIG. 6A is an illustration of an example display 91 presented by a communication device 90 for the connected customer to confirm that the associated customer is a member of the group. The example display 91 includes selection elements 93 and 94 that enable the connected customer to indicate that the associated customer is a member of the group or that the associated customer is not a member of the group, respectively. In response to detecting a user input, the communication device 90 may be configured to transmit an indication of the selection of elements 93 or 94 to the controller 16. To facilitate the confirmation, the confirmation message may include a set of image data 92 representative of the associated customer. In some embodiments, the set of image data 92 is the video object of the associated customer tracked by the controller 16. Additionally or alternatively, the controller 16 may apply a facial detection algorithm to image data representative of the associated customer stored at the image database 52 to identify a set of image data 92 includes a representation of the associated customer's face.

It should be appreciated that controller 16 may still periodically transmit confirmation messages to customers related to pairings that the example machine learning model 110 is confident that are in the same group. To this end, the customer feedback provided by the example display 91 informs the controller 16 whether the example machine learning model 110 reached the correct conclusion. Thus, the controller 16 is able to apply reinforcement training to the example machine learning model 110 using the user inputs provided via the example display 91. While the example display 91 is associated with a determination that the associated customer is a member of the group, to reduce the false negative rate of the example machine learning model 110, the controller 16 may transmit a confirmation message asking the connected customer to confirm that the associated customer is not a member of the group.

Figure 6B:
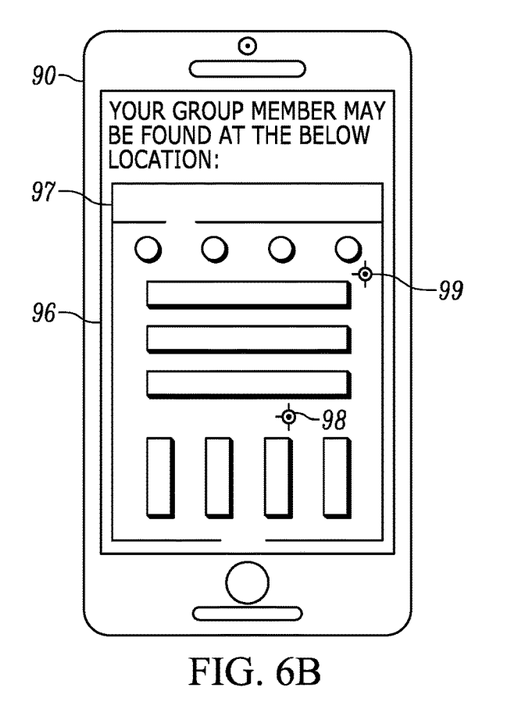
FIG. 6B is an illustration of an example display responsive to the connected customer requesting a location of the associated customer while within the venue of FIG. 1.

In some embodiments the controller 16 is configured to provide the location data stored at the location database 56 to the connected customer. Accordingly, FIG. 6B is an illustration of an example display 96 presented by the communication device 90 responsive to the connected customer requesting a location of the associated customer while within the venue 100 of FIG. 1. The example display 96 presents a map 97 of the venue 100 and includes an indication 98 of where the associated customer is location, as well as an indication 99 of where the connected customer is located. It should be appreciated that in larger groups, the example display 96 may include an indication representative of where each group member is located at the venue 100.

Figure 7:
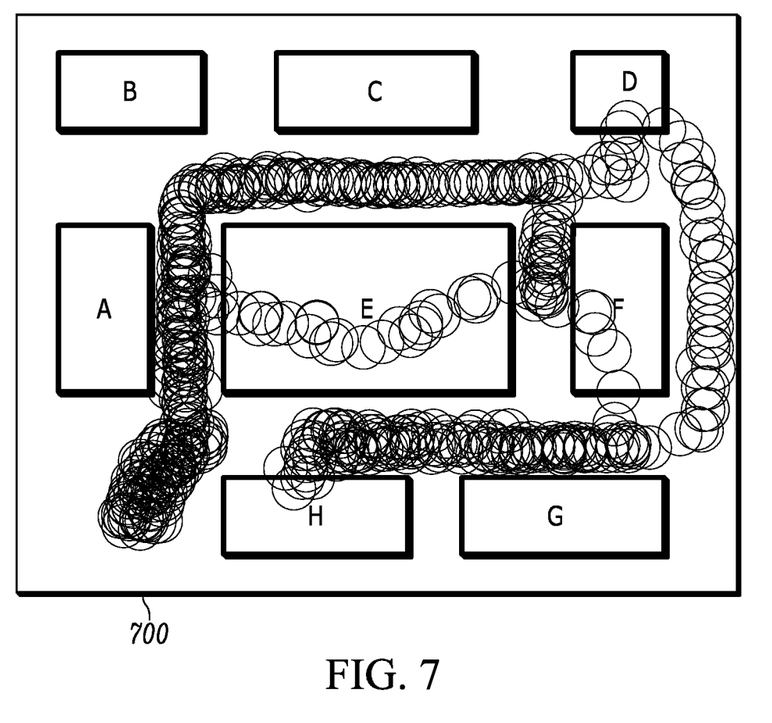
FIG. 7 is an illustration of an example heat map indicative of where the group spent time within the venue of FIG. 1.

Additionally, the controller 16 may be configured to generate a heat map indicative of where group members where located while visiting the venue 100. Accordingly, FIG. 7 is an illustration of an example heat map 700 indicative of where the group spent time within the venue 100 of FIG. 1. As illustrated, the heat map 700 includes "hotter" regions where the group members spent more time (e.g., the aisle between regions A and E) and "colder" regions where the group members spent less time (e.g., the aisle to the right of region F). In the example heat map 700, the hotter regions are represented by denser and darker circles, whereas the colder regions are sparser and more transparent. In other embodiments, a red to blue gradient may be utilized instead. Based on the heat map, a venue operator can readily determine which areas of the venue 100 resonated with the most the group members and/or identify any "hot" regions for which a group member did not make a purchase while at the venue so as to communicate a promotional offer to encourage the connected customer to return to the venue 100.

Figure 8:
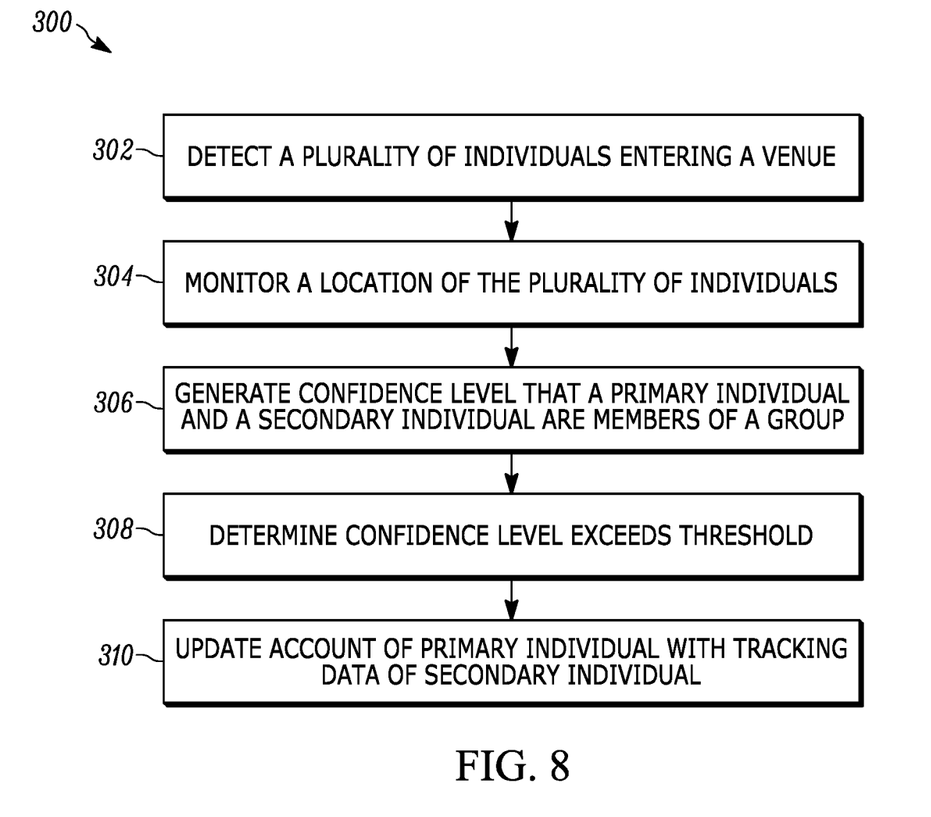
FIG. 8 is a flow chart of a method for grouping an associated customer with a connected customer, in accordance with an example embodiment.

FIG. 8 is a flow chart of a method 300 for grouping an associated customer with a connected customer, in accordance with an example embodiment. As described herein, the method 300 may be performed by a centralized controller 16 of a venue 100. The method 300 may begin at block 302 when the centralized controller 16 detects, via data obtained by a plurality of detector stations 30, a plurality of individuals entering the venue 100. The plurality of individuals include a primary individual (e.g., a connected customer) that (i) is carrying a communication device and (ii) has an account associated with the venue (e.g., has a record in an account database, such as the account database 54). The plurality of individuals also include a secondary individual (e.g., an associated customer) that (i) is not carrying a communication device and/or (ii) has no account associated with the venue 100.

At block 304, the centralized controller 16 monitors, via the data obtained by the plurality of detector stations 30, a respective location of each individual from the plurality of individuals as each individual traverses the venue 100. It should be appreciated that the specific item of data analyzed by the centralized controller 16 at block 304 may vary from the specific item of data analyzed at block 302. To this end, the specific item of data analyzed at block 304 is generally obtained by the plurality of detector stations 30 subsequent to the specific item of data analyzed at block 302 being generated by the plurality of detector stations. Accordingly, the term "the data obtained by the plurality of detector stations" generally refers to data generated by any of the plurality of detector stations 30 and not to any specific item of data.

As described with respect to FIG. 3, monitoring the plurality of individuals may vary depending on whether the centralized controller 16 is monitoring the location of a primary individual or a secondary individual. To this end, the centralized controller 16 may be configured to monitor a location of primary individuals based on communications received from the respective communication device of the primary individuals. On the other hand, the centralized controller 16 may be configured to monitor a location of the secondary individuals by tracking a video object corresponding to the secondary individuals. In either case, the centralized controller 16 may be configured to maintain a location database 56 that includes the monitored location data.

At block 306, the centralized controller 16 generates a confidence level that one of the primary individuals and at least one of the secondary individuals are members of a group. Accordingly, the centralized controller 16 may be configured to input the location data into machine learning model 110 that is configured to convert one or more aspects of the location data into the confidence level. As described with respect to FIG. 5, these aspects may include a relative time of entry, a proximity, a relative positioning, a path correlation, a number of times the paths reconverge, an area of the venue 100 where the individuals are located, and/or other factors consistent with the present disclosure.

It should be appreciated that the centralized controller 16 may be configured to execute blocks 304 and 306 repeatedly if the generated confidence level fails to exceed a threshold. That is, the centralized controller 16 may be configured to continuously monitor individuals as they traverse the venue 100 and generate and/or modify the confidence level as additional location data is obtained by the plurality of detector stations 30. At some point, at block 308, the centralized controller 16 determines that the confidence level exceeds a threshold confidence level.

At block 310, the centralized controller 16 updates the account associated with the venue 100 of the one of the primary individuals based on tracking data associated with the at least one of the secondary individuals. The tracking data is generated from the data obtained by the plurality of detector stations 30 and may include the location data, the path traversed by the individual, the identity of any products that the individual dwelled near, picked up, and/or purchased, and/or any other obtained by the detector stations 30. For example, the tracking data may identify a product that the at least one of the secondary individuals at least of remained proximate to for a predetermined amount of time, picked up, and purchased while at the venue. Accordingly, the centralized controller 16 is configured to update the account of the one of the primary individuals to include an indication of the product associated with the secondary individual.

It should be appreciated that the foregoing generally described determining whether an associated customer is in a group with a connected customer, the techniques described herein may also be implemented to determine whether two connected customers are in a group. In this scenario, the records for the connected customers at the account database 54 may maintain the association between connected customers such that when the connected customers subsequently return to the venue 100, the grouping can be readily determined upon detecting a connection identifier provided by the communication device associated with the connected customers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U. S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for tracking individuals within a venue, the system comprising:
    a plurality of detector stations disposed throughout the venue, each detector station including an imaging assembly, a raw video processing unit, a video object identifier, a multiplexer, and a transceiver configured to communicate with a communication device within the venue, the video object identifier associating a portion of raw image data with an identifier of a video object and routing the video object identifier to the multiplexer, and the multiplexer appending the video object identifier to a data packet generated by the raw video processing unit;
    a controller operatively connected to the plurality of detector stations, the controller comprising at least one processor configured to:
        detect, via data obtained by the plurality of detector stations, a plurality of individuals entering the venue, wherein one or more of the plurality of individuals is a primary individual that (i) is carrying a communication device and (ii) has an account associated with the venue, and wherein one or more of the plurality of individuals is a secondary individual that (i) is not carrying a communication device and/or (ii) has no account associated with the venue;
        monitor, via the data obtained by the plurality of detector stations, a respective location of each individual from the plurality of individuals as each individual traverses the venue;
        generate a confidence level that one of the primary individuals and at least one of the secondary individuals are members of a group;
        determine that the confidence level exceeds a threshold confidence level; and
        update the account associated with the venue of the one of the primary individuals with product preferences associated with the at least one of the secondary individuals, the product preferences for the at least one of the secondary individuals identified by analyzing tracking data being generated from the data obtained by the plurality of detector stations.

2. The system of claim 1, wherein to monitor the respective location of each individual from the plurality of individuals, the at least one processor is configured to:
    monitor a location of the one of the primary individuals based on communications received from the respective communication device of the one of the primary individuals; and
    monitor a location of the at least one of the secondary individuals by tracking a video object corresponding to the at least one of the secondary individuals.

3. The system of claim 1, wherein the at least one processor is further configured to:
    detect that the one of the primary individuals and the at least one of the secondary individuals have left the venue; and
    update the account to remove an indication that the one of the primary individuals and the one of the secondary individuals are members of the group.

4. The system of claim 1, wherein to generate the confidence level that the one of the primary individuals and the at least one of the secondary individuals are members of the group, the at least one processor is configured to:
    determine that the one of the primary individuals and the at least one of the secondary individuals entered the venue within a threshold time of one another; and
    increase the confidence level that the one of the primary individuals and the at least one of the secondary individuals are members of the group.

5. The system of claim 1, wherein the tracking data includes location data for an individual and/or a path traversed by an individual.

6. The system of claim 5, wherein to generate the confidence level that the one of the primary individuals and the at least one of the secondary individuals are members of the group, the at least one processor is configured to:
    determine a correlation between a first path traversed by the one of the primary individuals and a second path traversed by the at least one of the secondary individuals; and
    modify the confidence level based on the correlation between the first path and the second path.

7. The system of claim 6, wherein to determine the correlation between the first path and the second path, the at least one processor is configured to:
    determine an amount of time the first path and the second path are within a threshold distance of one another; and
    modify the confidence level based on the determined amount of time.

8. The system of claim 7, wherein the amount of time is determined based upon non-contiguous periods of time when the first path and the second path are within the threshold distance.

9. The system of claim 7, wherein to modify the confidence level, the at least one processor is configured to:
    determine a distance between the one of the primary individuals and the at least one of the secondary individuals; and
    modify the confidence level based upon the determined distance.

10. The system of claim 7, wherein to modify the confidence level, the at least one processor is configured to:
    determine that the first path and the second path indicate that the one of the primary individuals and the at least one of the secondary individuals are traversing the venue side-by-side; and
    in response to the determination, increase the amount the confidence level is modified.

11. The system of claim 7, wherein to determine the correlation between the first path and the second path, the at least one processor is configured to:
  determine a region of the venue where the first path and the second path are correlated; and
  modify the confidence level based upon the determined region of the venue.

12. The system of claim 7, wherein to determine the correlation between the first path and the second path, the at least one processor is configured to:
  determine a number of times the first path and the second path diverge and reconverge; and
  increase the correlation based the number of times the first path and the second path converge to within a predetermined distance.

13. The system of claim 1, wherein to update the account to indicate that the one of the primary individuals and the at least one of the secondary individuals are members of the group, the at least one processor is configured to:
  transmit a confirmation request to the communication device of the one of the primary individuals requesting that the one of the primary individuals confirms that the at least one of the secondary individuals is a member of the group; and
  update the account in response to a confirmation received from the communication device of the one of the primary individuals.

14. The system of claim 1, wherein the at least one processor is configured to:
  generate a heat map indicating an amount of time members of the group spent in different regions of the venue; and
  update the account to include an indication of the heat map.

15. The system of claim 1, wherein the at least one processor is configured to:
  receive, from the communication device of the one of the primary individuals, a location request for at least one other member of the group;
  analyze the tracking data associated with the at least one other member of the group to determine a respective location for each of the at least one other member of the group; and
  transmit, to the communication device of the one of the primary individuals, an indication of the respective locations for the at least one other member of the group.

16. The system of claim 1, wherein to update the account, the at least one processor is configured to:
  analyze the tracking data to identify a product that the at least one of the secondary individuals at least one of remained proximate to for a predetermined amount of time, picked up, and purchased while at the venue; and
  update the account of the one of the primary individuals to include an indication of the product.

17. A method for tracking individuals within a venue, the method comprising:
  detecting, via data obtained by a plurality of detector stations respectively including an imaging assembly, a raw video processing unit, a video object identifier, a multiplexer, and a transceiver configured to communicate with a communication device within the venue, a plurality of individuals entering the venue, wherein one or more of the plurality of individuals is a primary individual that (i) is carrying a communication device and (ii) has an account associated with the venue, and wherein one or more of the plurality of individuals is a secondary individual that (i) is not carrying a communication device and/or (ii) has no account associated with the venue;
  monitoring, via the data obtained by the plurality of detector stations, a respective location of each individual from the plurality of individuals as each individual traverses the venue;
  generating, via one or more processors, a confidence level that one of the primary individuals and at least one of the secondary individuals are members of a group;
  determining, via the one or more processors, that the confidence level exceeds a threshold confidence level; and
  updating, via the one or more processors, the account associated with the venue of the one of the primary individuals with product preferences associated with the at least one of the secondary individuals, the product preferences for the at least one of the secondary individuals identified by analyzing tracking data being generated from the data obtained by the plurality of detector stations,
  wherein the video object identifier associates a portion of raw image data with an identifier of a video object and routes the video object identifier to the multiplexer, and the multiplexer appends the video object identifier to a data packet generated by the raw video processing unit.

18. The method of claim 17, monitoring the respective location of each individual from the plurality of individuals comprises:
  monitoring a location of the one of the primary individuals based on communications received from the respective communication device of the one of the primary individuals; and
  monitoring a location of the at least one of the secondary individuals by tracking a video object corresponding to the at least one of the secondary individuals.

19. The method of claim 17, further comprising:
  detecting, via the one or more processors, that the one of the primary individuals and the at least one of the secondary individuals have left the venue; and
  updating, via the one or more processors, the account to remove an indication that the one of the primary individuals and the one of the secondary individuals are members of the group.

20. The method of claim 17, wherein updating the account comprises:
  transmitting a confirmation request to the communication device of the one of the primary individuals requesting that the one of the primary individuals confirms that the at least one of the secondary individuals is a member of the group; and
  updating, via the one or more processors, the account in response to a confirmation received from the communication device of the one of the primary individuals.

21. The method of claim 17, updating the account comprises:
  analyzing, via the one or more processors, the tracking data to identify a product that the at least one of the secondary individuals at least of remained proximate to for a predetermined amount of time, picked up, and purchased while at the venue; and
  updating, via the one or more processors, the account of the one of the primary individuals to include an indication of the product.

* * * * *